(12) United States Patent
Melbye (10) Patent No.: US 6,545,834 B1
(45) Date of Patent: Apr. 8, 2003

(54) METHOD AND APPARATUS FOR DIMENSIONAL TAPE WIDTH COMPENSATION IN A TAPE DRIVE SYSTEM

(75) Inventor: Hartvig E. Melbye, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/546,311

(22) Filed: Apr. 10, 2000

(51) Int. Cl.[7] ............................................... G11B 15/18
(52) U.S. Cl. ...................................... 360/71; 360/261.3
(58) Field of Search ........................ 360/71, 76, 73.14, 360/261.3, 72.2, 75, 77.12; 242/334, 334.6, 332.4, 615.1; 250/559.1

(56) References Cited

U.S. PATENT DOCUMENTS

| | | | | |
|---|---|---|---|---|
| 4,807,107 A | * | 2/1989 | Fincher | 700/126 |
| 5,212,388 A | * | 5/1993 | Izaelev | 250/559.1 |
| 5,218,490 A | * | 6/1993 | Sakamoto et al. | 360/71 |
| 5,280,402 A | * | 1/1994 | Anderson et al. | 360/261.3 |
| 5,287,233 A | * | 2/1994 | Lee et al. | 360/73.14 |
| 5,294,805 A | * | 3/1994 | Izraelev | 250/559.22 |
| 5,333,810 A | * | 8/1994 | Hoge et al. | 242/332.4 |
| 5,365,333 A | * | 11/1994 | Wirth et al. | 356/244 |
| 5,410,224 A | * | 4/1995 | Fujisawa | 318/6 |
| 5,450,257 A | * | 9/1995 | Tran et al. | 360/76 |
| 5,626,304 A | * | 5/1997 | Mukai | 242/334.6 |
| 5,639,040 A | * | 6/1997 | Honjo | 242/334 |
| 5,868,350 A | * | 2/1999 | Christie | 242/615.1 |
| 5,886,845 A | * | 3/1999 | Kilaparti et al. | 438/53 |
| 5,930,065 A | * | 7/1999 | Albrecht et al. | 360/72.2 |
| 5,947,410 A | * | 9/1999 | Christie | 242/615.1 |
| 6,005,737 A | * | 12/1999 | Connolly et al. | 360/75 |
| 6,018,429 A | | 1/2000 | Mantey et al. | 360/48 |
| 6,141,174 A | * | 10/2000 | Judge et al. | 360/76 |
| 6,239,939 B1 | * | 5/2001 | Bui et al. | 360/77.12 |
| 6,278,571 B1 | * | 8/2001 | Bui et al. | 360/77.12 |

* cited by examiner

Primary Examiner—David Hudspeth
Assistant Examiner—Fred F. Tzeng
(74) Attorney, Agent, or Firm—Carstens, Yee & Cahoon, L.L.P.

(57) ABSTRACT

A method and apparatus for reducing tape dimensional changes during accessing of a tape. A profile for the tape is identified. A determination is then made as to whether a location is being accessed on the tape. Tension applied to the tape is adjusted using the location and the profile, wherein tape width dimensional changes are minimized.

50 Claims, 5 Drawing Sheets

METHOD AND APPARATUS FOR DIMENSIONAL TAPE WIDTH COMPENSATION IN A TAPE DRIVE SYSTEM

BACKGROUND OF THE INVENTION

1. Technical Field

The present invention relates generally to an improved data processing system and in particular to a method and apparatus for accessing data on a storage device. Still more particularly, the present invention relates to a method and apparatus for accessing data on storage media in the form of a tape.

2. Description of Related Art

Tape drives also are peripheral mass storage devices often used to archive data on tapes for later access. Tape drives are also used as random access devices in data storage applications where cost of storage might be important and access time is of less significance. For example, many banks and financial institutions, insurance companies, and government agencies may use tape drives with applications regarding clients, accounts, patients, and other items of interest. In other applications, huge amounts of data are stored directly on tape for later retrieval and analysis. For example, with geophysical and space exploration, information gathered may be stored and analyzed at a later time. Today, much of the tape is stored in automatic libraries or silos in which the tapes are handled by robots. The tapes in these systems are automatically inserted into attached arrays of tape transports. These libraries are depositories of data cartridges and come in many sizes from tens of cartridges to as many as 6,000 cartridges within a single unit. Tape drives are commonly available in a cartridge format to archive data and software and to transport data and software between different computer systems. Further, tape also is used to back up critical data in case of a failure of the primary storage device, such as a hard disk drive.

In accessing data on a tape, a read or write head in a tape drive is positioned over one or more tracks on the tape. A servo track may be used for aligning the read or write head to the tracks containing the data. If the read or write head drifts from an optimal position relative to the track on the tape, an error signal is generated. The error signal increases as the read or write head drifts further from the optimal location relative to the data on the track on the tape. If the read or write head drifts too far relative to the data on the track, errors and data recovery problems occur in accessing the tape. Presently available systems adjust the position of the read or write head or the position of the tape relative to the read or write head to minimize the error signal generated during access of the tape.

Tapes often include a number of servo tracks with which transducers in a read or write head must stay aligned. The present invention recognizes that the alignment mechanisms used to move a tape or a read or write head to line up with a servo track are unable to efficiently compensate for changes in distance between these tracks when the width of the tape changes. As track densities increase, these variations in tape width may cause head transducer-to-tape track misalignments resulting in data errors.

Therefore, it would be advantageous to have an improved method and apparatus for minimizing tape width dimensional changes.

SUMMARY OF THE INVENTION

The present invention provides a method and apparatus for reducing tape dimensional changes during accessing of a tape. A profile for the tape is identified. A determination is then made as to a location that is being accessed on the tape. Tension applied to the tape is adjusted using the location and the profile, wherein tape width dimensional changes are minimized. Also, the tape width dimensional changes in the tape may be detected while the tape is being accessed. In this case, a signal is generated to alter the tension applied to the tape to minimize tape width dimensional changes.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
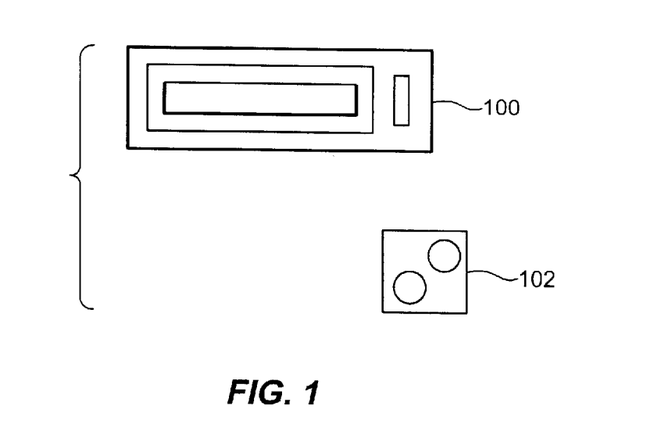
FIG. 1 is a diagram of a tape drive system illustrated in which the present invention may be implemented.

With reference now to the figures and in particular with reference to FIG. 1, a diagram of a system is illustrated in which the present invention may be implemented. A tape drive system 100 is configured to receive a tape cartridge, such as tape cartridge 102, which contains a housing with a loop of tape wound on one or more reels in the housing. Tape drive system 100 may be used for a variety of applications. For example, tape drive system 100 may be used as a stand alone unit within a computer to provide backup. Additionally, tape drive system 100 also may be used within a robotic tape cartridge handling system to receive tape cartridges handled by robotic arms. In such a case, tape drive system 100 is a stand alone system in which a separate controller is present for handling the accessing of tapes. Information may be retrieved from such a system for use by a computer.

In this example, the tape in tape cartridge 102 contains servo control information being located in tracks on the tape. Typically, this information is a repeating servo pattern of magnetic flux transitions. Alternatively, optical servo tracks also may be found on the tape. Tape drive system 100 can read servo control information and generate a position signal used to control the position of an associated data read head within tape drive system 100. Servo control information may be written onto the tracks using a servo write head. Tape cartridge 102 may take a variety of formats, such as, for example, 8 mm, 4 mm, ¼ inch, and ½ inch formats.

Figure 2:
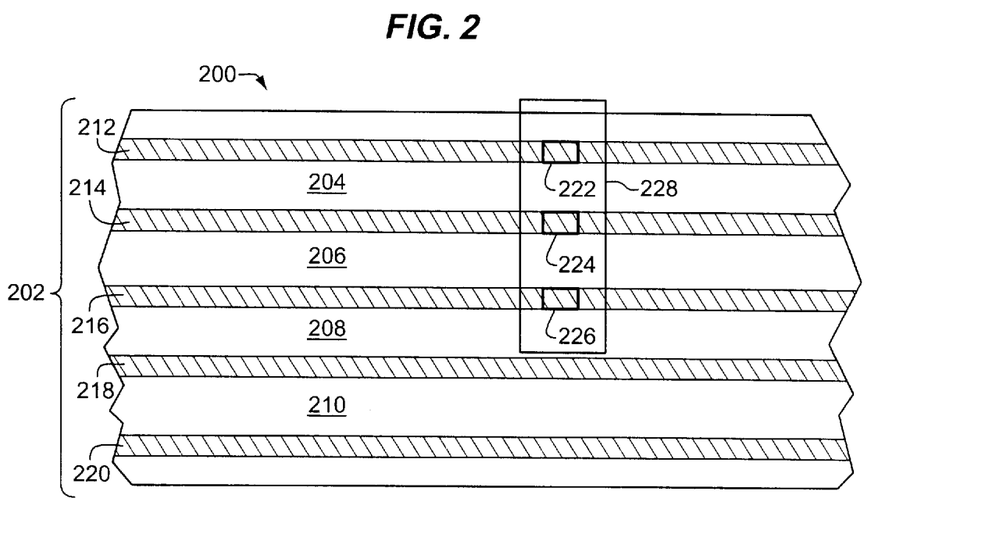
FIG. 2 is a diagram illustrating a tape and servo tracks in accordance with a preferred embodiment of the present invention.

With reference to FIG. 2, a diagram illustrating tape and servo tracks is depicted in accordance with a preferred embodiment of the present invention. Tape 200 has a width 202. Tape 200 illustrates data stripes 204–210 in which one or more data tracks are located. Also, servo tracks 212–220 are found on tape 200. As illustrated, servo tracks 212–220 are magnetic tracks, but may take other forms, such as, for example, optical tracks. In this example, five servo tracks are shown for purposes of illustrating the principles of the present invention. Depending on the implementation, other numbers of servo tracks may be found.

Servo read elements 222, 224, and 226 are located within head 228. These servo read elements or transducers, also referred to as "servo read heads", are found within a read/write head assembly 228 in this example. Servo read elements 222, 224, and 226 are positioned over servo tracks 212, 214, and 216 in these examples. These servo tracks may employ various patterns or frequency regions to allow precise tape-to-tape head positioning to allow for more accurate access of data from data tracks. The servo control system in a tape drive generates a position error signal based on differences in signal amplitudes generated by servo read elements 222, 224, and 226. Also, signal phase or timing difference data may be used to generate a position error signal. The position error signal is used to align the read/write head.

The present invention recognizes that although the read/write head may be aligned with the tracks at one location on tape 200, the alignment may change at another location due to changes in width 202. With high track densities, this type of dimensional variation may cause head transducer or head element misalignments resulting in data errors. These misalignments cannot be corrected by realigning the elements or transducers in a read/write head in presently available systems. The present invention provides a method, apparatus, and processor implemented instructions for minimizing tape width dimensional changes. The mechanism includes varying the tension applied to a tape to minimize these tape width dimensional changes.

Figure 3:
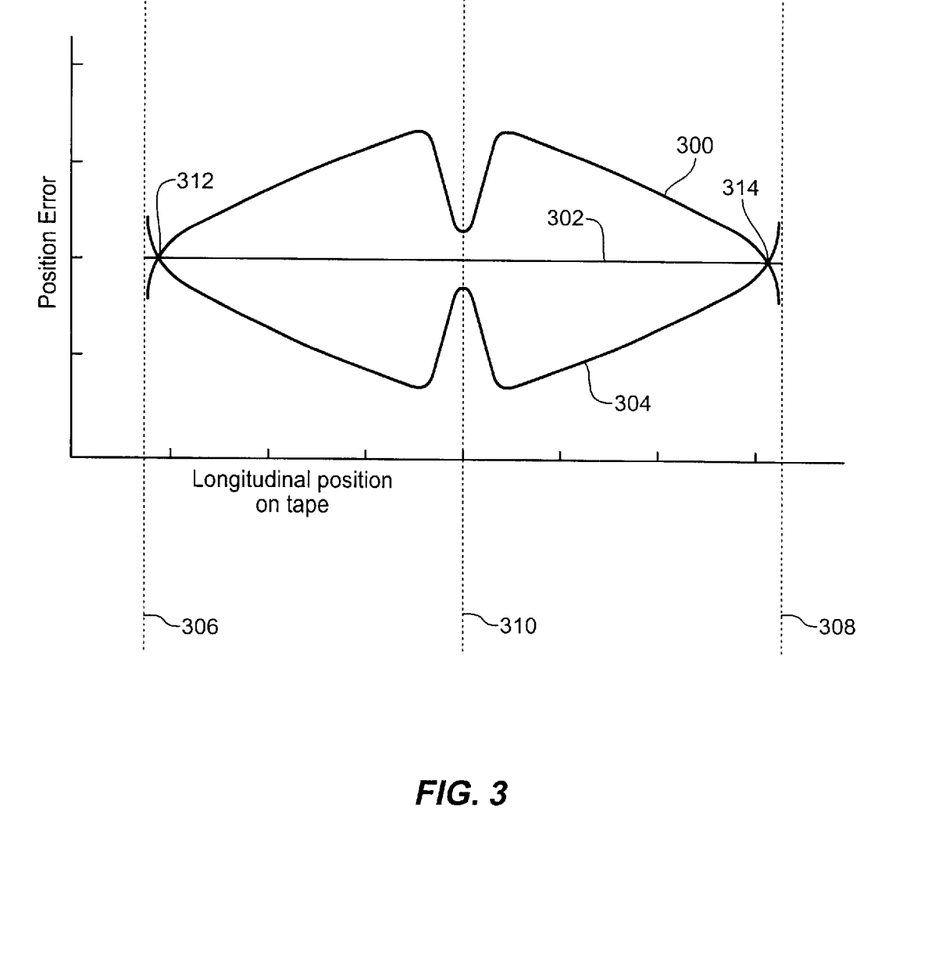
FIG. 3 is a diagram of servo position errors due to displacement of servo tracks to be minimized by the present invention in accordance with a preferred embodiment of the present invention.

Turning now to FIG. 3, a diagram of servo position errors due to displacement of servo tracks to be minimized by the present invention is depicted in accordance with a preferred embodiment of the present invention. In FIG. 3, the graph shows position error for a three servo track tape drive system in a two reel cartridge. In FIG. 3, line 300 represents data generated by servo element 222 in FIG. 2, line 302 illustrates data generated by servo read element 224 in FIG. 2, and line 304 shows data generated by servo read element 226 in FIG. 2. The tape, in this example, is located in a dual reel cartridge. Lines 300, 302, and 304 illustrate servo position errors due to displacement on a tape. The vertical axis indicates the amount of position or displacement error. Various units may be used, such as micrometers, microinches, or volts depending on the measurement made. The magnitude of the vertical axis varies depending on factors, such as, for example, the size of the cartridge and the reels, the materials used, and the dimensions of the tape. The horizontal axis identifies the longitudinal position. Specifically, the longitudinal position is an arbitrary, but fixed, measure of the physical locations lengthwise on the tape. The graph in FIG. 3 illustrates typical servo position error for a three-servo track system in a two reel cartridge. The beginning of each line at vertical line 306 represents the beginning or one end of the tape. Vertical line 308 represents the other end of the tape, while the vertical line 310 represents the middle of the tape. The symmetrical nature of the graph in FIG. 3 stems from the fact that equal amounts of tape are normally stored on each of the two reels. If, on the other hand, the tape is normally stored on one of the two reels, the profile will eventually approach the shape of either the left or right half of FIG. 3 depending onto which reel the tape is stored. The time constant of this change will depend on a variety of factors, such as environment, usage, spool size, and tape type.

In reading a tape, such as tape 200 in FIG. 2, the middle servo track, servo track 214, is positioned directly under servo read element 224. The upper servo track, servo track 212, and the lower servo track, servo track 216, are not aligned with servo read heads 222 and 226 except at crossover points 312 and 314 in FIG. 3. In FIG. 3, the actual tape dimensions are the inverse of the illustrated signals. These three lines illustrate a "bowtie" or "lips" effect, which is repeatable and predictable for a two-reel cartridge as the tape is played from one end to the other end.

In FIG. 3, although the tape is servo-written in a very controlled, parallel manner on the tape, compression and tension forces in the cartridge change the dimensions of this tape. In other words, in many cases the servo tracks written onto the tape from a large spool in which a length of tape is then placed on a reel in a cartridge. Servo tracks are written before spooling the tape onto a cartridge out of convenience so as to define the locations of the servo tracks in a very precise manner. Data is then written by a customer and the data tracks are referenced in location to the servo tracks to uniquely define the positions of the data tracks.

When tape is wound around a reel, compressive forces tend to press out or increase the width of the tape. Different parts of the tape will have different amounts of compressive forces based on where the tape is located. These compressive forces, also referred to as radial forces, are decreased or removed when the tape is unwound from the reel. Although the compressive forces that cause the tape to widen are removed when the tape is unwound, the dimensional width change is residual. Tension and tangential forces also are present. These forces stretch the tape and cause the tape to become narrower. The interaction between the radial compressive and tangential, tensile forces give rise to the long term dimensional variations of spooled tape. Assuming that no tension is applied to the reels in the storage of a two reel cartridge, the center of the tape indicates or is the location at which no forces are applied to the tape to change the dimension. As a result of the different forces applied to the tape, the width of the tape will change. These types of forces result in dimensional variations in the tape and thus, track to element displacements as shown by the servo position error signals illustrated in lines 300, 302, and 304.

The present invention provides a mechanism in which tension is changed according to the characteristic bowtie curve, such that the width of the tape is kept essentially constant over the entire length of the tape as the tape passes over the heads. The bowtie effect is predictable for a specific type of tape cartridge. The factors include, for example, a specific set of reels with a specific amount of tape, a specific thickness of the tape, and a specific composition of the tape. Thus, the mechanism of the present invention compensates or minimizes variations in tape width by changing the tension applied to the tape as a function of the location of the read/write head relative to the tape. This information forms a profile, which may be used to vary tension applied to the tape by selectively controlling motors turning the reels.

If various parameters for the tape or cartridge change, a new profile may be created. These parameters include, for example, the tape length in the cartridge, the thickness of the tape, the cartridge reel diameter, and the number of reels in the cartridge. For example, a single reel cartridge will have a different profile than that of a dual reel cartridge and will require a profile tailored to that specific type of cartridge.

Figure 4:
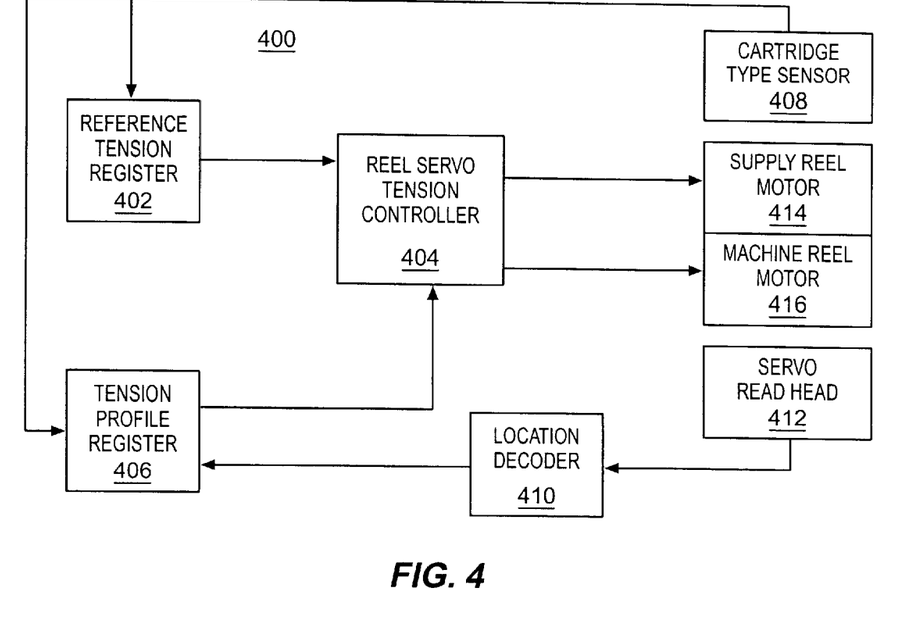
FIG. 4 is a diagram of a reel servo tension controller system with program tension profile compensation in accordance with a preferred embodiment of the present invention.

With reference now to FIG. 4, a diagram of a reel servo tension controller system with program tension profile compensation is depicted in accordance with a preferred embodiment of the present invention. In this example, tension applied to a tape is varied through a profile specifying tape tensions for different physical locations in the tape. Tape system 400 includes a reference tension register 402, a reel servo tension controller 404, and a tension profile register 406, which form a control unit. This control unit may include other components not shown or may exclude some components depending on the implementation. These blocks are functional blocks and may be implemented using a variety of mechanisms, including microprocessors and embedded controllers. Tape system 400 also includes a cartridge type sensor 408, a location decoder 410, a servo read head 412, a supply reel motor 414, and a machine reel motor 416. Servo read head 412, in this example, may include a number of servo read elements or transducers.

Cartridge type sensor 408 will identify a cartridge type present within tape system 400 and send an indication of this type in a signal to reference tension register 402 and tension profile register 406. Reference tension register 402 contains values for normal or average tensions required for constant tension operation. A nominal tension required for a given cartridge is selected by reference tension register 402, in response to a signal identifying the type of tape cartridge present within tape system 400. This tension information is sent to reel servo tension controller 404.

Servo read head 412 generates data signals from tracks on the tape, which are sent to location decoder 410. Location decoder 410 determines the actual physical location on the tape from location addresses obtained from servo read head 412. The physical location information is sent to tension profile register 406. Tension profile register 406 contains predetermined, average tension profiles as a function of tape location and tape type. Reference tension value received from reference tension register 402 and the tension profile values from tension profile register 406 are used by the processes of the present invention to generate tension compensation data to control the tension applied to the tape.

Based on the information received from cartridge type sensor 408 and location decoder 410, tension profile register 408 outputs tension compensation data to reel servo tension controller 404. Based on the data received, reel servo tension controller 404 will send appropriate control signals to supply reel motor 414 and machine reel motor 416 to maintain constant speed but variable tension to minimize tape width dimensional changes and maintain good transducer-to-tape alignment.

Figure 5:
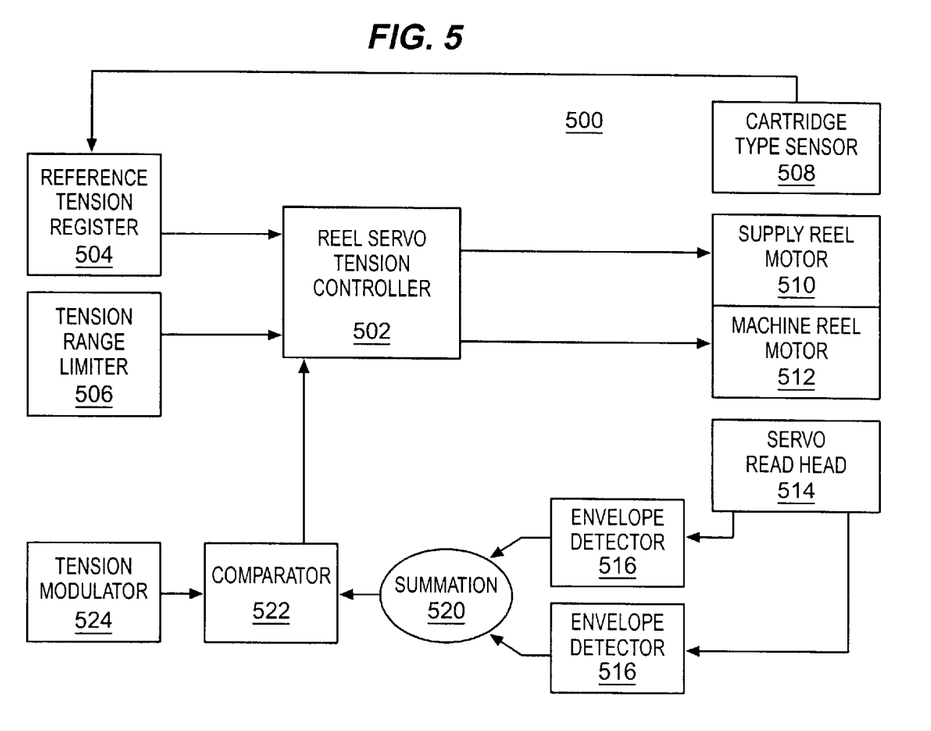
FIG. 5 is a diagram of a self-compensating reel servo tension controller system in accordance with a preferred embodiment of the present invention.

Turning next to FIG. 5, a diagram of a self-compensating reel servo tension controller system is depicted in accordance with a preferred embodiment of the present invention. In this example, the tension to the tape is varied using a closed loop control system to maintain a constant tape width. Tape system 500 includes a reel servo tension controller 502, a reference tension register 504, a tension range limiter 506, and a cartridge type sensor 508. Reference tension register 504 provides nominal tension information to reel servo tension controller 502 in response to identification of a cartridge type by cartridge type sensor 508. Tension range limiter 506 prevents reel servo tension controller 502 from applying or changing the tension beyond limits set within tension range limiter 506. Supply reel motor 510 and machine reel motor 512 are controlled by reel servo tension controller 502 to apply a selected tension to the tape. In these examples, although the tension applied to tape varies, the speed is constant.

Servo read head 514 generates read signals from transducers or elements within the read head. These signals are sent to envelope detectors 516 and 518. In this example, only two envelope detectors are illustrated, one for each servo read element or transducer, for purposes of illustration. If additional servo read elements or transducers are present, additional envelope detectors are used to receive signals from those elements or transducers. Envelope detector 516 and 518 output amplitude signals, which are proportional to the read signal strengths generated from servo read head 514. A head positioning servo (not shown) keeps the read head aligned on the tracks. If, however, a dimensional difference exists between the transducers and the tape tracks, a smaller amplitude signal results.

The output from envelope detector 516 and 518 are input into a summation unit 520, which sums the inputs to form a summed signal. This summed signal is sent to comparator 522, which compares the summed signal with a signal from tension modulator 524. Tension modulator 524 produces a relatively slow varying signal. This signal is typically of a sinusoidal nature. The sine wave is used to generate the tension modulation signal in tension modulator 524. The amplitude of this signal may be comparable to the amplitude of the summed signal generated by summation unit 520 for ease of comparison. However, such an amplitude is not required. The frequency of the signal is typically set to be lower than the servo read signal spectrum, but higher than the rate of tape dimensional changes. If the summed signal increases as the signal from the tension modulator increases, an indication or signal to increase the tension is sent to reel servo tension controller 502 from comparator 522. The increase in the summed signal with the increase in the signal from tension modulator 524 indicates that the tracks are too far apart on the tape. In other words, the width of the tape has increased. The increased tension stretches the tape and brings the track closer together, resulting in better transducer-to-track alignment.

On the other hand, if the summed signal decreases while the signal from tension modulator 524 increases, a signal or indication is generated by comparator 522 to decrease the tension. This signal is sent from comparator 522 to reel servo tension controller 502. The relationship between the modulation signal changes and effect on the tape, the effect on the summed signal, and the change in applied tension are shown below in Table 1.

TABLE 1

| Modulation signal | Effect on tape | Effect on summed read signal | Change in applied tension |
| --- | --- | --- | --- |
| Increase | Narrower | Increase | Increase |
|  |  | Decrease | Decrease |
| Decrease | Wider | Increase | Decrease |
|  |  | Decrease | Increase |

As can be seen, an increase in the modulation signal causes the tape to become narrower. If the summed read signal increases, then the change in applied tension is decreased. Conversely, if the summed read signal decreases, the change in the applied tension also is a decrease. When the modulation signal decreases in amplitude, the effect is that the tape will become wider. If the summed read signal increases, the change in the applied tension is to decrease the tension. Conversely, a decrease in the summed read signal results in an increase in the applied tension to the tape by the present invention.

Tension range limiter 506 provides data information to reel servo tension controller 502 to ensure that the tape tension is not increased or decreased beyond an operating range needed to read or damage the tape. This information may be provided as a set of upper and lower limits for the amount of tension applied to the tape. With the information from comparator 522, reference tension register 504, and tension range limiter 506, reel servo tension controller 502 sends control signals to supply reel motor 510 and machine reel motor 512 to vary the tension on the tape while maintaining a constant speed.

Figure 6:
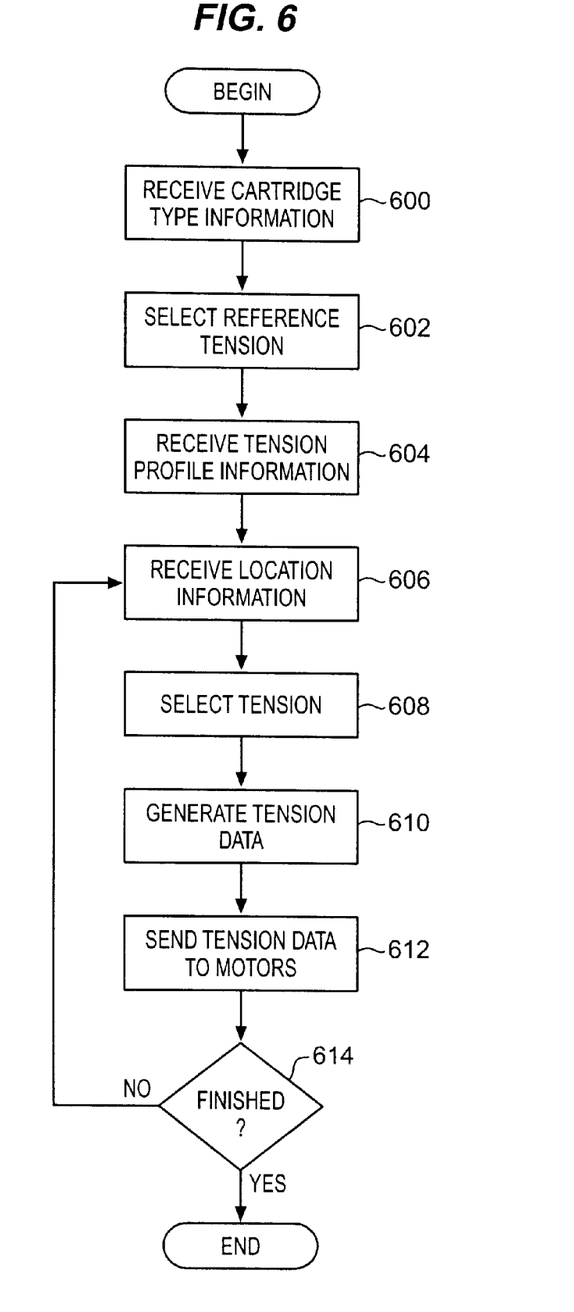
FIG. 6 is a flowchart of a process controlling tape width dimensions using a tension profile in accordance with a preferred embodiment of the present invention.

With reference now to FIG. 6, a flowchart of a process controlling tape width dimensions using a tension profile is depicted in accordance with a preferred embodiment of the present invention. The processes illustrated in FIG. 6 may be implemented in a tape system, such as tape system 400 in FIG. 4. The processes illustrated in FIG. 6 may be implemented in one or more components in tape system 400 in FIG. 4. Alternatively, other mechanisms may be used to implement these steps. For example, a microcontroller and a memory may be used to implement all of the steps in this process.

The process begins by receiving cartridge type information (step 600). This cartridge type information may be received from a cartridge type sensor, such as cartridge sensor 408 in FIG. 4. Additionally, a reference tension is selected based on the cartridge type information (step 602). Tension profile information is received based on the cartridge type information (step 604). Next, location information is received (step 606) A tension is selected based on the location information and the profile (step 608). Tension data or signals are then generated (step 610). The tension data or signals are generated using the tension selected in step 608 and the referenced tension selected in step 602. This data may be generated using a reel servo tension controller, such as reel servo tension controller 404 in FIG. 4. These data or signals generated in step 606 depend on the location of the head relative to the tape and the profile. Depending on the location and the profile, the data or signals may increase the tension, decrease the tension, or make no change in the tension being applied to the tape. The data or signals are then sent to the motors controlling the reels moving the tape (step 612).

A determination is then made as to whether accessing of the tape has finished (step 614). If the tape is still being accessed, the process returns to step 606. Otherwise, the process terminates.

Figure 7:
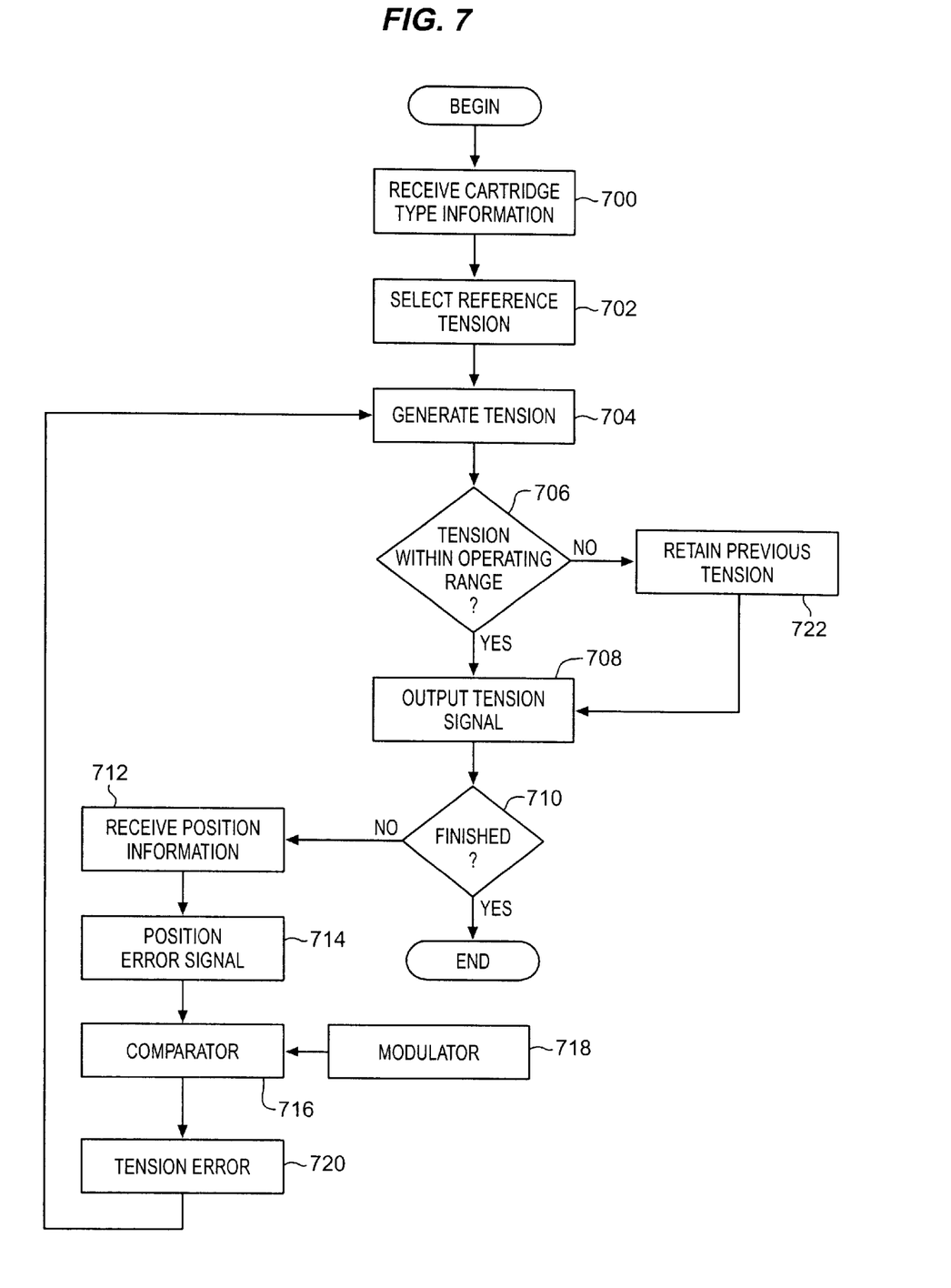
FIG. 7 is a flowchart of a process for controlling tape width dimensions using a closed loop in accordance with a preferred embodiment of the present invention.

With reference now to FIG. 7, a flowchart of a process for controlling tape width dimensions using a closed loop is depicted in accordance with a preferred embodiment of the present invention. This process may be implemented in a tape system, such as tape system 500 in FIG. 5. The process may be implemented using one or more components in tape system 500 in FIG. 5 or through other mechanisms. For example, a microprocessor and a memory may be used to implement the processes.

The process begins by receiving cartridge type information (step 700). This cartridge type information may be identified using a cartridge type sensor, such as a cartridge type sensor 508 in FIG. 5. A reference tension is then selected (step 702). Next, a tension generator is used to generate a tension value (step 704). The step may be performed using a reel servo tension controller, such as reel servo tension controller 502 in FIG. 5. Initially, this tension may be the reference tension until error or other position information is obtained to identify adjustments. A determination is made as to whether the tension is within the operating range (step 706). This operating range may be selected in a number of ways. For example, the upper and lower tension limits may be selected to allow reading of the tape while preventing damage to the tape. If the tension is too low, poor head to tape contact may result which in turn leads to poor read signal integrity. Poor read signal integrity results in high error rates. On the other hand, if the tension is too high, excessive component wear and tape damage may result. The limit values are transport and tape dependent and will vary depending on a particular transport system design.

If the tension is within the operating range, the selected tension changes output as a signal to a motor to change the tension applied to the tape (step 708).

A determination is then made as to whether access to the tape has completed (step 710). If access to the tape is incomplete, the position information of the read head relative to the tape is obtained (step 712). A position error signal is generated from this information (step 714). This position error signal information may be, for example, the information generated by summation unit 520 in FIG. 5. Comparator 716 compares this position error signal generated in step 714 with a modulated signal from modulator 718 to generate a tension error signal (step 720). Modulator 718 generates a signal, such as the one generated by tension modulator 524 in FIG. 5. This tension error signal is used in step 704 to generate tension data.

With reference again to step 706, if the tension is outside of the operating range, the current tension is retained (step 722) with the process then proceeding to step 708 to output the signal to maintain the current tension being applied to the tape. With reference again to step 710, if access to tape is complete, the process then terminates.

Thus, the present invention provides a method, apparatus, and processor implemented instructions for maintaining transducer-to-track alignment in tape based storage device systems. The present invention provides this advantage through varying tape tension to maintain proper alignment of read and write transducers with respect to the servo tracks. The mechanism of the present invention allows for maintaining tape width dimensions through the length of the tape to reduce or minimize errors caused by dimensional variations in the width of the tape.

It is important to note that while the present invention has been described in the context of a fully functioning tape drive system, those of ordinary skill in the art will appreciate that the processes of the present invention are capable of being distributed in the form of a processor or controller readable medium of instructions. In particular, these processes may be distributed for use in tape drive systems in a processor readable medium recognized by particular tape drive systems. The processes of the present invention may be implemented in hardware or through the use of processor readable instructions for carrying out the steps illustrated above. The processes of the present invention may be distributed on computer or processor readable media for use in different tape drives regardless of the particular type of signal bearing media actually used to carry out the distribution. Examples of computer or processor readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer or processor readable media may take the form of coded formats that are decoded for actual use in a particular data processing system. The description of the present invention has been presented for purposes of illustration and description, and is not intended to be exhaustive or limited to the invention in the form disclosed. Many modifications and variations will be apparent to those of ordinary skill in the art. For example, specific configurations are illustrated in FIGS. 4 and 5 for carrying out tension control using profiles and feedback systems. These diagrams illustrate components, which may be combined or separated into other functional units to carry out the processes described with respect to these diagrams. For example, many of the steps may be implemented within a single microprocessor, using microcontrollers and circuits, or through application specific circuits.

Further, the examples illustrate operations involving reading data. The mechanism of the present invention may be extended to writing data on a tape. The examples are depicted using a constant tape speed. These processes also may be used when the tape speed varies. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for reducing tape dimensional changes during accessing of a tape, the method comprising:
   identifying a profile for the tape;
   determining a location being accessed on the tape; and
   adjusting tension applied to the tape using the location and the profile.

2. The method of claim 1, wherein the tape includes a plurality of servo tracks and wherein the adjusting step comprises:
   adjusting tension applied to the tape using the location and the profile to maintain a substantially constant distance between the plurality of servo tracks.

3. The method of claim 1, wherein the tape includes a set of servo tracks and further comprising:
   receiving error data generated by detecting the set of servo tracks; and
   wherein the adjusting step includes adjusting the tension using the error data.

4. The method of claim 1 further comprising:
   accessing the tape;
   receiving error data from accessing the tape, wherein the error data identifies changes in the tape width dimensional changes; and
   generating the profile, wherein the profile includes tension settings associated with locations on the tape.

5. The method of claim 4, wherein the tape includes a set of servo tracks and wherein the error data is generated by reading the set of servo tracks.

6. The method of claim 5, wherein the servo tracks include data.

7. The method of claim 1, wherein the tape is stored in a single reel cartridge.

8. The method of claim 1, wherein the tape is stored in a dual reel cartridge.

9. The method claim 1, wherein the tape is a magnetic tape.

10. The method of claim 1, wherein a substantially constant tape speed is maintained while adjusting the tension applied to the tape.

11. The method of claim 1, wherein a varying tape speed occurs while adjusting the tension applied to the tape.

12. A method for generating a profile used to access a tape, the method comprising:
    accessing the tape;
    receiving error data from accessing the tape, wherein the error data identifies tape width dimensional changes; and
    generating the profile, wherein the profile includes tension settings associated with locations on the tape.

13. A method for minimizing errors in accessing a tape, the method comprising:
    detecting an error signal while accessing the tape; and
    adjusting a tension applied to the tape.

14. The method of claim 13, wherein the adjusting step comprises:
    adjusting the tension in a direction until the error signal increases; and
    responsive to the error signal increasing, changing the direction in which the tension is adjusted.

15. The method of claim 13, wherein the error signal is generated from reading a set of servo tracks on the tape.

16. The method of claim 13, wherein the tape is stored in a single reel cartridge.

17. The method of claim 13, wherein the tape is stored in a dual reel cartridge.

18. The method claim 13, wherein the tape is a magnetic tape.

19. The method of claim 13, wherein a substantially constant tape speed is maintained while adjusting the tension applied to the tape.

20. A tape system comprising:
    a motor, wherein the motor moves the tape within the tape system and applies a tension to the tape;
    a servo read head, wherein the servo read head provides data identifying a physical location on the tape; and
    a control unit connected to the servo read head and the motor, wherein the control unit selectively controls a tension applied to the tape based on a physical location of the servo read head on the tape and a profile associated with the tape.

21. The tape system of claim 20 wherein the control unit comprises:
    a controller connected to the motor; and
    a tension profile unit connected to the controller and the servo read head, wherein the tension profile unit identifies the profile in response to detecting a type of tape present in the tape system and sends tension compensation data to the controller based on a physical location of the read head on the tape and the profile.

22. The tape system of claim 21, wherein the tension profile unit is connected to the servo read head by a location decoder, wherein the location decoder decodes location addresses received from the servo read head to identify physical locations on the tape.

23. The tape system of claim 22 further comprising:
    a cartridge type sensor connected to the tension profile unit, wherein the cartridge type sensor identifies the type of tape present in the tape system.

24. The tape system of claim 20, wherein the motor is a supply reel motor and further comprising:
    a machine reel motor connected to the control unit, wherein the machine reel motor contributes to the tension applied to the tape and wherein the control unit controls the supply reel motor and the machine reel motor to selectively control the tension applied to the tape.

25. The tape system of claim 20, wherein the tape is a magnetic tape.

26. A tape system comprising:
   a motor, wherein the motor applies a tension to a tape being moved by the motor;
   a servo read head, wherein the servo read head produces a set of read signals;
   a summation unit connected to the servo read head, wherein the summation unit sums the set of read signals generated by the servo read head to form a summed signal;
   a tension modulator, wherein the tension modulator generates a sinusoidal signal;
   a comparator connected to the summation unit and the tension modulator, wherein the comparator compares the summed signal to the sinusoidal signal to generate an output signal, wherein the output signal indicates an increase in the tension in response to the summed signal increasing while the sinusoidal signal increases and indicates a decrease in the tension in response to the summed signal decreasing while the sinusoidal signal increases; and
   a tension controller connected to the comparator, wherein the tension controller sends signals to the motor to adjust the tension using the output signal from the comparator.

27. A tape system comprising:
   a motor, wherein the motor applies a tension to a tape being moved by the motor;
   a servo read head, wherein the servo read head produces a set of read signals;
   a tension control unit connected to the motor and the servo read head, wherein the tension control unit sends signals to the motor to selectively change the tension applied to the tape in response to changes in the set of read signals.

28. The tape system of claim 27, wherein the tension control unit comprises:
   a summation unit connected to the servo read head, wherein the summation unit sums the set of read signals generated by the servo read head to form a summed signal;
   a tension modulator, wherein the tension modulator generates a sinusoidal signal;
   a comparator connected to the summation unit and the tension modulator, wherein the comparator compares the summed signal to the sinusoidal signal to generate an output signal, wherein the output signal indicates an increase in the tension in response to the summed signal increasing while the sinusoidal signal increases and indicates a decrease in the tension in response to the summed signal decreasing while the sinusoidal signal increases; and
   a tension controller connected to the comparator, wherein the tension controller sends signals to the motor to adjust the tension using the output signal from the comparator.

29. The tape system of claim 27, wherein the tape includes a set of servo tracks and wherein the read signals are generated from reading the set of servo tracks.

30. An apparatus for reducing tape dimensional changes during accessing of a tape, the apparatus comprising:
   identifying means for identifying a profile for the tape;
   determining means for determining a location being accessed on the tape; and
   adjusting means for adjusting tension applied to the tape using the location and the profile, wherein tape dimensional changes during accessing of the tape is reduced.

31. The apparatus of claim 30, wherein the adjusting means is a first adjusting means and further comprising:
   second adjusting means for adjusting tension applied to the tape using the location and the profile to maintain a constant distance between the plurality of servo tracks.

32. The apparatus of claim 30, wherein the tape includes a set of servo tracks and further comprising:
   receiving means for receiving error data generated by detecting the set of servo tracks; and
   wherein the adjusting means includes adjusting the tension using the error data.

33. The apparatus of claim 30, wherein the adjusting means is a first adjusting means and further comprising:
   accessing means for accessing the tape;
   receiving means for receiving error data from accessing the tape, wherein the error data identifies changes in the tape width dimensional changes; and
   generating means for generating the profile, wherein the profile includes tension settings associated with locations on the tape.

34. The apparatus of claim 33, wherein the tape includes a set of servo tracks and wherein the error data is generated by reading the set of servo tracks.

35. The apparatus of claim 34, wherein the servo tracks include data.

36. The apparatus of claim 30, wherein the tape is stored in a single reel cartridge.

37. The apparatus of claim 30, wherein the tape is stored in a dual reel cartridge.

38. The apparatus claim 30, wherein the tape is a magnetic tape.

39. The apparatus of claim 30, wherein a constant tape speed is maintained while adjusting the tension applied to the tape.

40. An apparatus for generating a profile used to access a tape, the apparatus comprising:
   accessing means for accessing the tape;
   receiving means for receiving error data from accessing the tape, wherein the error data identifies tape width dimensional changes; and
   generating means for generating the profile, wherein the profile includes tension settings associated with locations on the tape.

41. A apparatus for minimizing errors in accessing a tape, the apparatus comprising:
   detecting means for detecting an error signal while accessing the tape; and
   adjusting means for adjusting a tension applied to the tape.

42. The apparatus of claim 41, wherein the adjusting means is a first adjusting means and further comprises:
   second adjusting means for adjusting the tension in a direction until the error signal increases;
   changing means, responsive to the error signal increasing, for changing the direction in which the tension is adjusted.

43. The apparatus of claim 41, wherein the error signal is generated from reading a set of servo tracks on the tape.

44. The apparatus of claim 41, wherein the tape is stored in a single reel cartridge.

45. The apparatus of claim 41, wherein the tape is stored in a dual reel cartridge.

46. The apparatus claim 41, wherein the tape is a magnetic tape.

47. The apparatus of claim 41, wherein a constant tape speed is maintained while adjusting the tension applied to the tape.

48. A computer program product in a computer readable medium for reducing tape dimensional changes during accessing of a tape, the computer program product comprising:

first instructions for identifying a profile for the tape;

second instructions for determining a location being accessed on the tape; and third instructions for adjusting tension applied to the tape using the location and the profile, wherein tape width dimensional changes are minimized.

49. A computer program product in a computer readable medium for minimizing errors in accessing a tape, the computer program product comprising:

first instructions for detecting an error signal while accessing the tape; and second instructions for adjusting a tension applied to the tape to reduce to the error signal.

50. A computer program product in a computer readable medium for generating a profile used to access a tape, the computer program product comprising:

first instructions for accessing the tape;

second instructions for receiving error data from accessing the tape, wherein the error data identifies tape width dimensional changes; and third instructions for generating the profile, wherein the profile includes tension settings associated with locations on the tape.

* * * * *